(12) United States Patent
Reichinger et al.

(10) Patent No.: US 8,766,509 B2
(45) Date of Patent: Jul. 1, 2014

(54) METHOD AND DEVICE FOR CONTROLLING A SOLID BODY ACTUATOR

(75) Inventors: Christian Reichinger, Neutraubling (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 454 days.

(21) Appl. No.: 13/133,700

(22) PCT Filed: Nov. 24, 2009

(86) PCT No.: PCT/EP2009/065772
§ 371 (c)(1),
(2), (4) Date: Aug. 3, 2011

(87) PCT Pub. No.: WO2010/066575
PCT Pub. Date: Jun. 17, 2010

(65) Prior Publication Data
US 2011/0279066 A1    Nov. 17, 2011

(30) Foreign Application Priority Data
Dec. 11, 2008  (DE) .......................... 10 2008 061 586

(51) Int. Cl.
*H01L 41/09*    (2006.01)
(52) U.S. Cl.
USPC .......................................... 310/314; 310/317
(58) Field of Classification Search
CPC .................... F02D 41/2096; F02D 2041/2058; F02D 2041/2048; F02D 2041/2051; F02D 2041/2072
USPC ..................................... 310/314, 316.01, 317
See application file for complete search history.

(56) References Cited

U.S. PATENT DOCUMENTS

| 4,715,353 | A | * | 12/1987 | Koike et al. ................... 123/590 |
| 5,130,598 | A | * | 7/1992 | Verheyen et al. .......... 310/316.03 |
| 6,184,631 | B1 | * | 2/2001 | Noma et al. .................. 315/224 |
| 7,034,437 | B2 | * | 4/2006 | Fukagawa et al. ........ 310/316.03 |
| 7,732,946 | B2 | | 6/2010 | Götzenberger ............... 307/115 |
| 7,732,976 | B2 | * | 6/2010 | Fukagawa et al. ........ 310/316.03 |
| 7,765,987 | B2 | | 8/2010 | Steinbauer et al. ........... 123/490 |
| 7,812,503 | B2 | * | 10/2010 | Kakehi et al. ................. 310/317 |
| 2008/0238199 | A1 | | 10/2008 | Gotzenberger ........... H02J 1/04 |
| 2009/0183714 | A1 | * | 7/2009 | Mayuzumi ..................... 123/490 |

FOREIGN PATENT DOCUMENTS

| AT | 503441 A4 | 10/2004 | ............. F02D 41/02 |
| DE | 102004015002 A1 | 10/2005 | ............. F02D 41/20 |
| DE | 102004029906 A1 | 1/2006 | ............. F02D 41/20 |
| DE | 102005040531 A1 | 3/2007 | ............. H02N 2/06 |
| WO | 03/067073 A1 | 8/2003 | ............. F02D 41/20 |
| WO | 2005/059339 A1 | 6/2005 | ............. F02D 41/20 |
| WO | 2006/106094 A1 | 10/2006 | ............. F02D 41/20 |
| WO | 2010/066575 A1 | 6/2010 | ............. H01L 41/04 |

OTHER PUBLICATIONS

International Search Report and Written Opinion for Application No. PCT/EP2009/065772 (18 pages), Mar. 31, 2010.

* cited by examiner

*Primary Examiner* — Bentsu Ro
(74) *Attorney, Agent, or Firm* — King & Spalding L.L.P.

(57) ABSTRACT

In a discharge process of the solid body actuator (2), a current that discharges the solid body actuator (2) loaded with electrical energy is detected. A switching element (6) is switched from an open position to a closed position to short circuit the solid body actuator (2) for removal of electrical energy from the solid body actuator (2) through the switching element (6) depending on the current falling below a threshold of the current, wherein the magnitude of the threshold is specified.

17 Claims, 2 Drawing Sheets

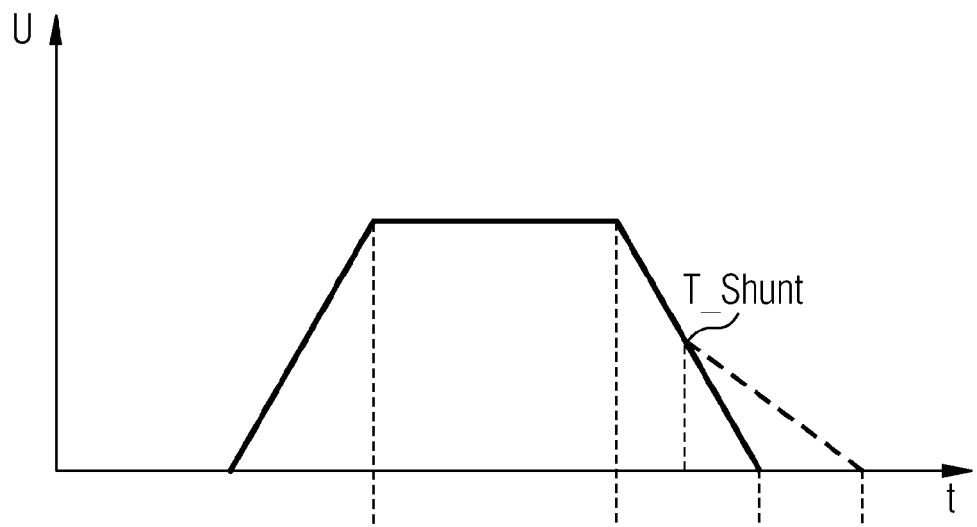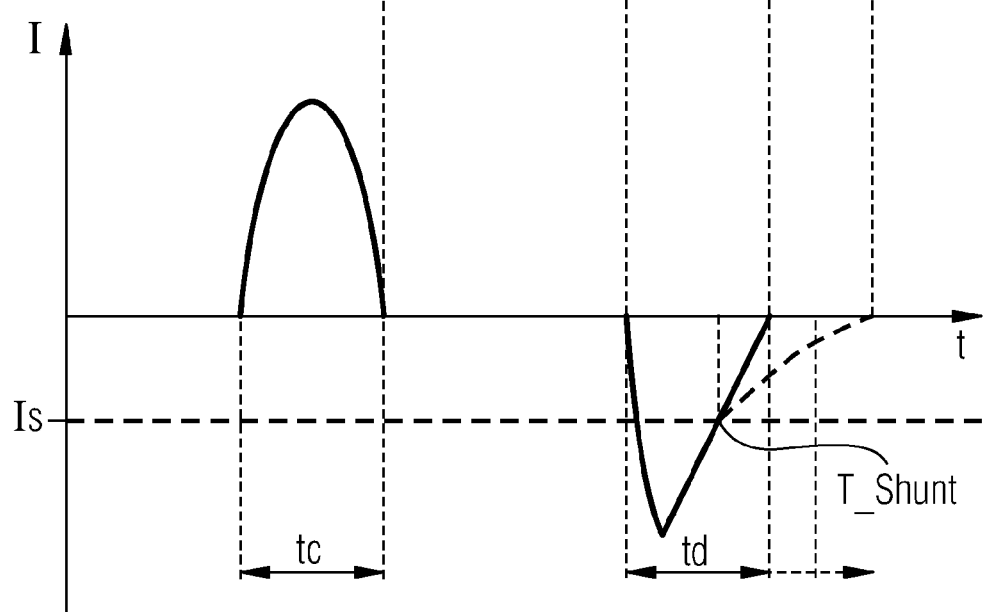

METHOD AND DEVICE FOR CONTROLLING A SOLID BODY ACTUATOR

CROSS-REFERENCE TO RELATED APPLICATIONS

This application is a U.S. National Stage Application of International Application No. PCT/EP2009/065772 filed Nov. 24, 2009, which designates the United States of America, and claims priority to German Application No. 10 2008 061 586.2 filed Dec. 11, 2008, the contents of which are hereby incorporated by reference in their entirety.

TECHNICAL FIELD

The present application concerns a method and device for controlling a solid body actuator.

BACKGROUND

Increasingly stringent legal requirements relating to the permissible pollutant present emissions of internal combustion engines which are arranged in motor vehicles make it necessary to perform various measures by means of which the pollutant emissions are lowered. A starting point here is to lower the fuel emissions generated during the combustion process of the air/fuel mixture. In particular, the formation of soot is heavily dependent on the preparation of the air/fuel mixture in the respective cylinder of the internal combustion engine. In order to achieve very good preparation of the mixture, fuel is increasingly metered under very high pressure. In the case of diesel internal combustion engines, the fuel pressures are up to 2000 bar. For such applications, injection valves in which a solid body actuator is embodied as a piezo-actuator are becoming increasingly established. Piezo-actuators are defined by very short response times. Such injection valves are in this way suitable under certain circumstances for repeatedly metering fuel within a working cycle of a cylinder of the internal combustion engine.

Particularly good preparation of the mixture can be achieved if one or more pre-injections, which are also referred to as pilot injections, take place before a main injection, wherein under certain circumstances, a very small fuel quantity is to be metered for the individual pre-injection. Precise control of the injection valve is very important, in particular, for these cases.

An important role is assigned to the charging and discharging of the piezo-actuator in the context of the precise control of the injection valve. Rapid charging and discharging of the piezo-actuator is highly significant in particular in the case of intentional use of pilot injections.

DE 10 2005 040 531 A1 discloses a control device with a power source which is provided for controlling a piezo-actuator, wherein the power source can be coupled to the piezo-actuator in such a way that it can discharge the piezo-actuator, and wherein said control device has a power output stage for charging and discharging the piezo-actuator, which power output stage is electrically parallel to the power source.

SUMMARY

According to various embodiments, a method and a device for controlling a solid body actuator can be provided by means of which the solid body actuator can be rapidly discharged.

According to an embodiment, in a method for controlling a solid body actuator, during a discharging process of the solid body actuator,—a current is detected which discharges the solid body actuator to which electrical energy is applied, and—a switching element is switched from an open position into a closed position as a function of the current falling below a threshold which is predefined in terms of absolute value, in order to short-circuit the solid body actuator for the purpose of removing electrical energy from the solid body actuator via the switching element.

According to a further embodiment, the predefined threshold can be representative of a maximum average current of the switching element which is predefined in terms of absolute value.

According to another embodiment, a device for controlling a solid body actuator can be embodied in such a way that during a discharging process of the solid body actuator, said device detects a current which discharges the solid body actuator to which electrical energy is applied, said device switches a switching element from an open position into a closed position as a function of the current falling below a threshold which is predefined in terms of absolute value, in order to short-circuit the solid body actuator for the purpose of removing electrical energy from the solid body actuator via the switching element.

BRIEF DESCRIPTION OF THE DRAWINGS

Exemplary embodiments are explained below with reference to the schematic drawings, in which:

FIG. 2 shows the profile of a voltage of the solid body actuator, FIG. 3 shows the profile of a current of the solid body actuator.

Elements with an identical design or function are characterized by the same reference symbols.

DETAILED DESCRIPTION

According to various embodiments, in a method and a corresponding device for controlling a solid body actuator, during a discharging process of the solid body actuator, a current is detected which discharges the solid body actuator to which electrical energy is applied. A switching element is switched from an opening position into a closed position as a function of the current falling below a threshold which is predefined in terms of absolute value, in order to short-circuit the solid body actuator for the purpose of removing electrical energy from the solid body actuator via the switching element. The short-circuiting enables rapid discharging of the solid body actuator. The threshold which is predefined in terms of absolute value can contribute to effective counteracting of the overheating of the switching element.

According to an embodiment, the predefined threshold is representative of a maximum average current of the switching element which is predefined in terms of absolute value. This makes it possible, in a particularly easy and precise way, to make a contribution to ensuring that the switching element can be operated without being damaged. In particular, thermal overloading of the switching element can be easily counteracted.

Figure 1:
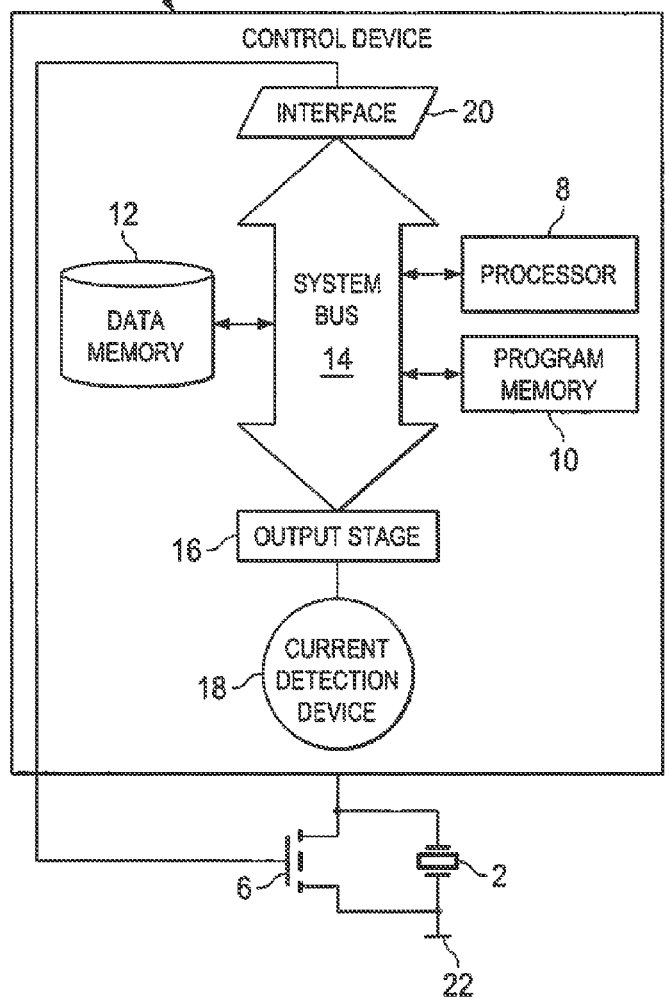
FIG. 1 shows a circuit diagram of a solid body actuator, a control device and a switching element.

FIG. 1 shows a circuit diagram with a schematic illustration of a solid body actuator 2, a control device 4 for actuating the solid body actuator 2 and a switching element 6.

The solid body actuator 2 has two electrical terminals and can be embodied, for example, as a piezo-actuator. The control device 4 can be embodied, for example, as a microcontroller and comprises a processor 8, a program memory 10 and a data memory 12. The processor 8, the program memory 10 and the data memory 12 are coupled to one another electrically via a system bus 14, for example for the purpose of exchanging data. An output stage 16 is also electrically coupled to the system bus 14, and can be controlled via the system bus 14 and is designed to apply electrical energy to the solid body actuator 2. The output stage 16 can be embodied, for example, as a power output stage. In order to measure a current I, the output stage 16 is electrically coupled to a current detection device 18. The control device 4 also comprises an interface 20.

The control device 4 is electrically coupled to the switching element 6 via the interface 20. The control device 4 is electrically coupled to one of the electrical terminals of the solid body actuator 2 and to the switching element 6 via the current detection device 18. Both the switching element 6 and the other electrical terminal of the solid body actuator 2 are electrically coupled to a reference potential 22, which can be a ground potential.

The switching element 6 can be embodied, for example, as a transistor. Transistors can easily be overloaded thermally through the generation of heat as a consequence of large currents. In particular, if the switching element 6 is embodied as a transistor, the maximum current I which refers to a chronological average and which flows through the switching element 6 is preferably predefined in such a way that it is adapted to the current carrying capacity of the switching element 6. As a rule it is possible for the maximum current I which is predefined for the chronological average to be exceeded for short time intervals without leading to overheating.

FIGS. 2 and 3 show the profile of a voltage U plotted against the time t or the profile of the current I plotted against the time t during a charging process tc and a discharging process td.

In order to apply electrical energy to the solid body actuator 2, one or more current pulses, which electrically charge the solid body actuator 2, are predefined by the output stage 16 during the charging process tc. As a result, during the charging process tc the voltage U which is present at the solid body actuator 2 rises. In a time period between the charging process tc and the discharging process td, the voltage U which is present at the solid body actuator 2 is virtually constant. During the discharging process td, the electrical energy is conducted away to the solid body actuator 2. The discharging process td can take place, for example, passively. In the case of a passive discharging process td, the current I which discharges the solid body actuator 2 results from the voltage U which is present across the solid body actuator 2.

In order to accelerate the passive discharging process td, it is possible, for example, for both electrical terminals of the solid body actuator 2 to be coupled to the reference potential 22. This can occur, for example, by means of the switching element 6 which can be switched from an opening position into a closed position by the control device 4. If the switching element 6 is in the closed position, the two electrical terminals of the solid body actuator 2 are coupled to the reference potential 22, which can also be referred to as a short-circuit of the solid body actuator 2. The switching from the open position into the closed position of the switching element 6 takes place at a time T_Shunt. The time T_Shunt of the switching is dependent on a predefined threshold Is and occurs when the absolute value of the current I falls below the threshold Is which is predefined in terms of absolute value.

FIGS. 2 and 3 show the discharging process td both with and without switching of the switching element 6 from the open position into its closed position. The dashed curve in FIG. 2 represents the voltage profile U for a case in which the switching element 6 remains in its open position and is not switched into the closed position. The current profile I which is continued by a dashed line in FIG. 3 corresponds to this. The curve of the voltage U which is continued with the continuous line in FIG. 2 or of the current I in FIG. 3 represents the case for which the switching element 6 is switched into its closed position at the time T_Shunt. As is easily apparent from a comparison of the curves which are continued by dashed lines with the curves which are continued by continuous lines in FIGS. 2 and 3, the discharging process td is terminated earlier in the case of the short-circuiting by means of the switching element 6 than in the case of a discharging process td without the short-circuit.

Figure 4:
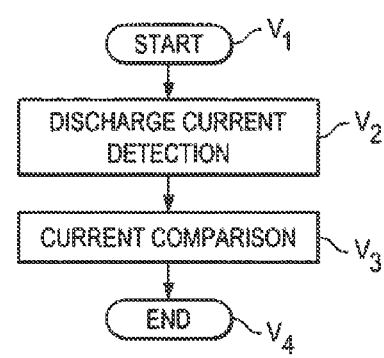
FIG. 4 shows a flowchart.

FIG. 4 shows a flowchart with the method steps V1 to V4 for actuating the solid body actuator 2 by means of the control device 4. The method steps V1 to V4 can be implemented, for example, in a program of the control device 4 which can be stored, for example, in the program memory 10.

The program starts in a first step V1. During the first step V1 variables can, for example, be initialized.

A second step V2 starts as soon as the solid body actuator 2 is in the discharging process td. The current I with which the solid body actuator 2 is discharged is detected by means of the current detection device 18.

In a third step V3 it is determined when the current I falls below the threshold Is which is predefined in terms of absolute value. When the current I falls below the threshold Is which is predefined in terms of absolute value, the switching element 6 is switched from the open position into the closed position by means of the control device 4, with the result that the solid body actuator 2 is short-circuited and from then on is discharged via the switching element 6.

In an embodiment, the threshold Is is representative of a maximum average current I of the switching element 6 which is predefined in terms of absolute value. The threshold Is can, however, also be representative, for example, of a maximum average current, predefined in terms of absolute value, of another electronic component, for example of an electronic component in the output stage 16. The switching of the switching element 6 from the open position into the closed position at the time at which the maximum average current, T_Shunt, which is predefined in terms of absolute value is undershot, permits rapid discharging of the solid body actuator 2 without the switching element 6 or other electronic components being damaged.

The program ends in a fourth step V4.

What is claimed is:

1. A method for controlling a solid body actuator, the method comprising:
   during a discharging process of the solid body actuator:
   detecting an actuator discharge current,
   allowing a passive discharge of the solid body actuator for a time period, during which an absolute value of the actuator discharge current rises to a maximum value and then falls toward zero,
   during the fall of the absolute value of the actuator discharge current:
   detecting that the absolute value of the actuator discharge current falls below a predetermined threshold value between zero and the maximum value, and
   in response to such detection, switching a switching element from an open position in which the solid body actuator is not short-circuited to a closed position in which the solid body actuator is short-circuited, thereby increasing the subsequent rate of current discharge from the solid body actuator.

2. The method according claim 1, wherein the predefined threshold is representative of the absolute value of a maximum average current of the switching element.

3. The method according to claim 1, wherein the solid body actuator is a piezo-actuator.

4. The method according claim 1, wherein:
in the open position of the switching element, one side of the solid body actuator is connected to ground, and
in the closed position of the switching element, both sides of the solid body actuator is connected to ground.

5. A device for controlling a solid body actuator, the device comprising:
a processor, and
a memory storing a program executable by the processor to, during a discharging process of the solid body actuator:
monitor an actuator discharge current of the solid body actuator,
allow a passive discharge of the solid body actuator for a time period, during which an absolute value of the actuator discharge current rises to a maximum value and then falls toward zero,
during the fall of the absolute value of the actuator discharge current:
detect that the absolute value of the actuator discharge current falls below a predetermined threshold value between zero and the maximum value, and
in response to such detection, switch a switching element from an open position in which the solid body actuator is not short-circuited to a closed position in which the solid body actuator is short-circuited, thereby increasing the subsequent rate of current discharge from the solid body actuator.

6. The device according claim 5, wherein the predefined threshold is representative of the absolute value of a maximum average current of the switching element.

7. The device according to claim 5, wherein the solid body actuator is a piezo-actuator.

8. The device according to claim 5, wherein the device is a microcontroller controlled by the program stored in the memory.

9. The device according to claim 5, wherein the switching element is a transistor.

10. The device according to claim 5, wherein the predefined threshold is representative of the absolute value of a maximum average current of an electronic component in the output stage.

11. A fuel injection system, comprising:
a solid body actuator,
a control device configured to control the solid body actuator and comprising an output stage operable to apply electrical energy to the solid body actuator, a current detection device for determining a current through said solid body actuator, and an interface, and
a switching element coupled in parallel with the solid body actuator and being controlled through the interface,
wherein the control device is configured to, during a discharging process of the solid body actuator:
monitor the current detected by the current detection device,
allow a passive discharge of the solid body actuator for a time period, during which an absolute value of the actuator discharge current rises to a maximum value and then falls toward zero,
during the fall of the absolute value of the actuator discharge current:
detect that the absolute value of the actuator discharge current falls below a predetermined threshold value between zero and the maximum value, and
in response to such detection, control the switching element via the interface to switch from an open position in which the solid body actuator is not short-circuited to a closed position in which the solid body actuator is short-circuited, thereby increasing the subsequent rate of current discharge from the solid body actuator.

12. The system according to claim 11, wherein the switching element is a transistor.

13. The system according to claim 11, wherein the predefined threshold is representative of the absolute value of a maximum average current of the switching element.

14. The system according to claim 11, wherein the predefined threshold is representative of the absolute value of a maximum average current of an electronic component in the output stage.

15. The system according to claim 11, wherein the solid body actuator is a piezo-actuator.

16. The system according to claim 11, wherein the control device is a microcontroller comprising a processor, a program memory, a data memory, and a system bus.

17. The system according to claim 16, wherein the control device is configured by programming the program memory of the microcontroller.

* * * * *